United States Patent [19]
Ditzik

[11] Patent Number: 5,668,570
[45] Date of Patent: Sep. 16, 1997

[54] DESKTOP COMPUTER WITH ADJUSTABLE FLAT PANEL SCREEN

[76] Inventor: Richard J. Ditzik, 3143 Carnegie Ct., San Diego, Calif. 92122

[21] Appl. No.: 288,882

[22] Filed: Aug. 10, 1994

Related U.S. Application Data

[63] Continuation-in-part of Ser. No. 84,011, Jun. 29, 1993, abandoned.

[51] Int. Cl.$^6$ .................................................. G09G 3/00
[52] U.S. Cl. ......................... 345/173; 345/179; 345/905; 364/708.1; 361/681; 248/923
[58] Field of Search .................... 248/917, 918, 248/920, 921, 923, 922, 919; 361/679, 688, 724, 680, 681, 682; 345/905, 173, 179, 180; 364/708.1; 400/83, 84; 178/18, 19

[56] References Cited

U.S. PATENT DOCUMENTS

| | | | |
|---|---|---|---|
| 4,624,434 | 11/1986 | Lake et al. | 248/454 |
| 4,717,112 | 1/1988 | Pirkle | 248/639 |
| 4,718,740 | 1/1988 | Cox | 361/681 |
| 4,729,533 | 3/1988 | Hillary et al. | 248/920 |
| 4,859,092 | 8/1989 | Makita | 400/83 |
| 4,864,601 | 9/1989 | Berry | 370/125 |
| 4,980,848 | 12/1990 | Griffin et al. | 361/688 |
| 5,115,374 | 5/1992 | Hongoh | 361/681 |
| 5,126,955 | 6/1992 | Tomoda | 364/708 |
| 5,173,686 | 12/1992 | Fujihara | 345/905 |
| 5,190,302 | 3/1993 | Trotta | 280/35 |
| 5,196,993 | 3/1993 | Herron et al. | 361/681 |
| 5,200,913 | 4/1993 | Hawkins et al. | 364/708 |
| 5,278,779 | 1/1994 | Conway et al. | 364/708.1 |
| 5,386,219 | 1/1995 | Greanias et al. | 345/179 |

FOREIGN PATENT DOCUMENTS

| | | | |
|---|---|---|---|
| 02148086 | 6/1990 | Japan | 345/905 |
| 2280192 | 11/1990 | Japan | 345/905 |
| 03150588 | 6/1991 | Japan | 345/905 |
| 0415680 | 1/1992 | Japan | 345/905 |
| 04221989 | 8/1992 | Japan | 345/905 |
| 04267285 | 9/1992 | Japan | 345/905 |
| WO91/04461 | 4/1991 | WIPO | |

*Primary Examiner*—Richard Hjerpe
*Assistant Examiner*—Lun-Yi Lao

[57] ABSTRACT

A relatively small transportable desktop computer/workstation with a display panel assembly (2) in combination with a microprocessor or controller (44) is made display screen position adjustable, in inclination angle, azimuth angle and elevation translation movements. The workstation can have a pen or stylus touch screen input function (36) added, so that a user or operator can write, draw and sketch directly onto the screen in a natural manner. The workstation can be placed on top of a desk or table providing an ergonomic man-machine interface for information communications between individual users via a communications network. A keyboard (7, 42), voice/speaker telephone (48), mouse or trackball input unit (46), and communications modem (42) may be added to the workstation. The flat panel display, pen input means and microprocessor can be combined into an assembly, which can be removed from the main body for portable mobile computing operation.

21 Claims, 5 Drawing Sheets

DESKTOP COMPUTER WITH ADJUSTABLE FLAT PANEL SCREEN

This application is a continuation-in-part of application Ser. No. 08/084,011, filed Jun. 29, 1993, now abandoned.

BACKGROUND OF THE INVENTION

1. Field of the Invention

This invention relates to desktop or portable computers with flat panel displays. In particular it relates to personal computers that will lie on a desk or table, which a human operator will use to: (1) enter keyboard data, pen or voice data/information; (2) view displayed information and/or (3) hear audio/voice information.

2. Description of the Prior Art

Heretofore, portable computers with flat panel displays were embodied in a "clamshell" type design. When these prior art computers are ready for use, the display panel is unfolded to a roughly vertical orientation. The attached keyboard and computer enclosure form the bottom half of the clamshell. For portable transport, the flat panel display is folded down over the keyboard and computer enclosure. This prior art configuration has several shortcomings. First, since the unit sits on a desk or table, the screen is always at a lower elevation than the eye level of the person sitting and operating the computer. Thus the person must continually look down to the display. Over long periods of time, this will cause neck and back strain on the user. Secondly, if a pen/stylus input means is added to the display screen, the roughly vertical operating orientation is inconvenient and ergonomically incorrect when the user is handwriting or sketching. If the user tries to hold his/her arm up to write on a vertical screen, the users arm will tire. Over long periods of writing on a vertical screen, this awkward position will cause strain on one's wrist. Even if the user is willing to hold his/her hand up to write on the vertical screen, it may not be physically secure for the user's hand pressure. Thirdly, the prior art clamshell design does not provide elevation adjustment or azimuth angle adjustment means. This restricts the ergonomic usability of the prior art computer and display units.

For example, U.S. Pat. No. 4,859,092 of Makita discloses a portable typewriter and display unit. However, a single pair of pivoting arms connect the display unit to the main body. When its display unit is raised to its highest elevation, the distance from the user's eyes to the display screen is large. Therefore, middle aged users who are near sighted, will have difficulty in viewing the screen. No pen/stylus input mean is disclosed, but even if one is added, the display unit would not provide a physically secure writing surface. The Makita does not provide a means of placing equal and opposite restraining force onto the display unit. U.S. Pat. No. 4,624,434 of Lake discloses a tiltable display terminal, but no display unit elevation adjustment is taught. Again no pen input means is disclosed, and if one is added, the unit would not be physically stable for normal hand/arm forces applied by the user. U.S. Pat. No. 5,115,374 of Hongoh teaches a laptop portable computer with a facsimile function. Hongoh discloses a touch panel screen, but no pen input means, and no vertical elevation adjustment of its display unit is taught. In order to provide a horizontal display orientation, the display unit must be detached from the main body and set back, in reverse orientation, to the connector sockets on the main body, which is a severe disadvantage.

Several prior art pen computer units exit. However, their display screens are fixed to their enclosure to form a flat tablet. They are designed for the mobile user market. This limits their use for desktop pen/stylus computing environments. No prior art has solved the problem of a personal computer for the office environment, capable of standard computing, pen computing, and voice telephone communications.

The invention disclosed herein solves the above problems by providing an ergonomic designed desktop system that is capable of several important computer and communications functions. It provides a display panel assembly, pen/stylus input unit, multiple support arms, and a main unit in a roughly wedge shape. The display panel assembly can be adjusted in inclination angle, azimuth angle and elevation. Thus invention overcomes the problems of the prior art. For example, the display panel of the invention can be easily adjusted by hand in elevation to a height roughly of the user's eye level. The user does not have to look down to see the screen when in normal PC-keyboard operation. If the unit is used as a pen/stylus computer, the display panel can be folded by hand to a physically secure position, at an inclination angle that is ergonomically correct for handwriting and sketching. Finally, the display screen can be physically adjusted in many orientation combinations, including azimuth angles, inclination angles and elevation translations. Thus the invention can be used in a wide range on office desktop positions and by a wide range of users and orientations.

SUMMARY OF THE INVENTION

The disclosed invention overcomes the shortcomings of the prior art by providing display screen adjusting means for desktop computers and terminals, such that the entire apparatus is sufficiently small to be portable or transportable. The invention disclosed herein provides an easy to use desktop workstation, to which the human user can adjust its screen for many screen positions. In addition, the workstation can fold down for transport. The workstation may also include external communication means such as voice/data modem and/or telephone means.

Accordingly an object of the invention is to provide small compact workstation for the office, having an array of useful functions and capabilities at the finger tips of the human user sitting at his/her desk. Functions may include pen/stylus input means, computer means, display device(s), mass memory devices, keyboard, mouse, speaker phone, network interface and modem.

Another object of the invention is to give the user a voice and data communications capability at the desktop, capable of standard text/graphics computing, as well as voice/video/pen communication to others individuals or computers, via modem or network (LAN/WAN) interfaces.

Still another object of invention is to provide the user with an ergonomic workstation that can be adjusted to a wide range of positions and orientations, such that there will be a reduction or elimination of body stress and fatigue by the user, over long periods of use.

Still another object of the invention is to provide a modular desktop workstation such that the user can configure the workstation to how he/she works, or to their choice at a particular time. For example, the user will have the choice of using a detached keyboard, pen/stylus input, mouse, trackball, handset telephone, or speaker telephone, depending on his/her wishes for accomplishing a particular task.

Still another object of the invention is to provide a unit that is small and light enough for the user to easily transport it to other locations. Other objects of the invention will become evident by reading the following invention descriptions and inspection of the accompanying drawings.

DETAILED DESCRIPTION

Figure 1A:
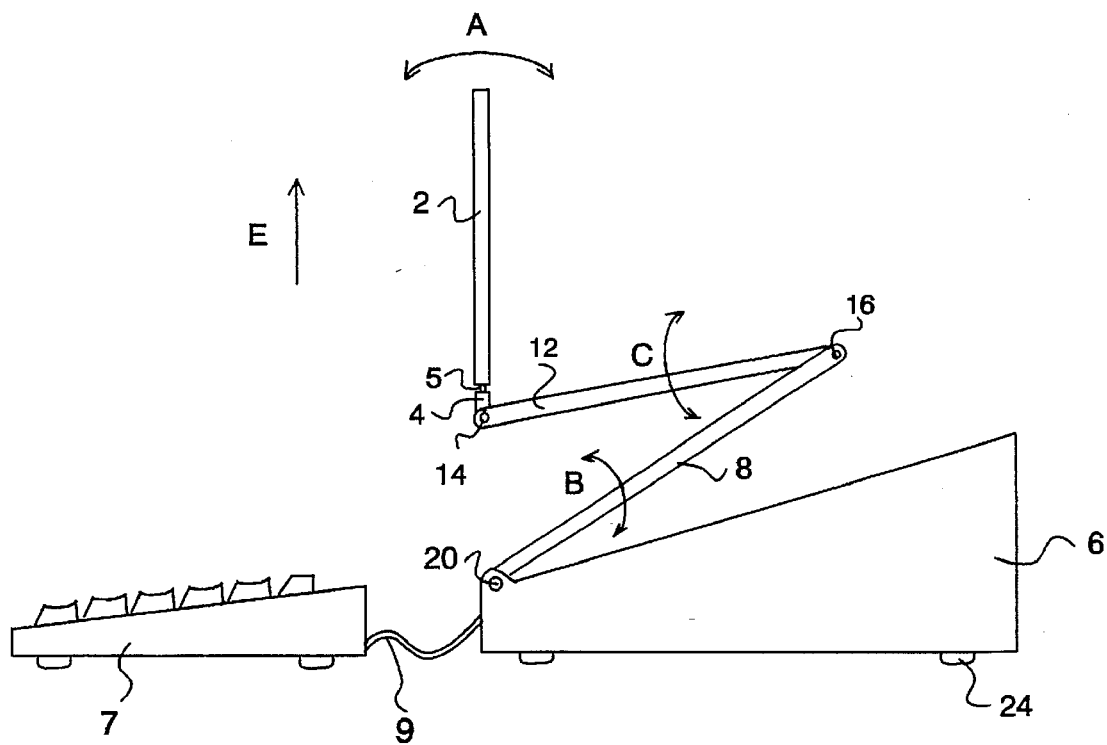
FIG. 1A is a side view of the desktop workstation with the display panel assembly oriented vertically and somewhat raised from its lowest position.
Figure 1B:
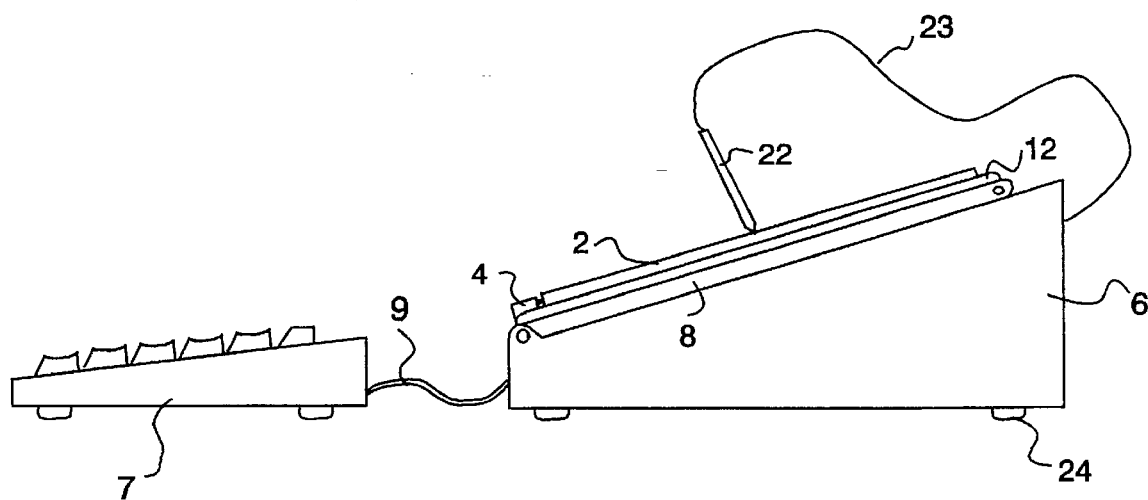
FIG. 1B is a side view of the desktop with the display panel assembly folded to its lowest inclined position, with a stylus/pen input means.

The invention can be described with reference to FIGS. 1A and 1B shows a desktop workstation from the side in two different display screen orientations and modes of operation. The term desktop workstation is defined to be an interactive man-machine or man-computer interface, in which a human being can enter and view data/information. The workstation or interface may or may not include a digital computing means. A display panel assembly 2 is attached to a support structure 4 via a hinge pin 5. The support structure 4 is connected to a support arm 12 via a hinge means 14. The display panel assembly 2 includes a relatively thin display device further defining a viewing screen. Examples of the possible display technologies are Liquid Crystal Displays (LCD), electroluminescent, plasma panel, and field emission displays. They may be monochrome or color, and they could be light modulator or light emitter types of displays. LCD's are most commercially available flat panel display devices, available in a wide variety of sizes, shapes, resolutions and other characteristics.

Typical of these LCD's is the Sharp Electronics Corporation's LM64P90 and LM64K90 monochrome LCD's. They have a 640×480 display pixel format, a viewing area of 196×148 mm, a dot pitch of 0.30×0.03 mm, and cold cathode fluorescent backlight. The former has 150 ms rise plus fall response time, a transmissive viewing mode, 50 Nits brightness, and 13:1 contrast ratio. The latter has a 250 ms rise plus fall response time, a transflective viewing mode, 35 Nits brightness, and 10:1 contrast ratio. For many applications, color LCD's are required. Sharp Electronics Corp. makes several direct-view color Thin Film Transistor (TFT) LCD modules. Typical specifications for their LQ10DH11 product are a 640 (×3)×480 display pixel format, 211×158 mm viewing area, a 0.33(0.11×3)×0.33 mm dot pitch, a hot cathode fluorescent backlight.

The display panel assembly 2 is free to rotate through large inclination angles (at least 90 degrees), represented by rotation A, about the hinge axis of hinge means 14. Support arms 12 and 8 in turn connect the display panel to the workstation a main unit 6. The main unit may include an enclosure or housing for control electronics including a digital computer, microprocessor or other control means. The display panel assembly 2 may be electrically connected to electronics located in the main unit 6, via an electrical cable routed inside the support structure 4 and support arms 12 and 8, or via a cable routed externally to the main unit. The size of main unit 6 should be small, so as to not present a large "foot print" on the desk or table. The unit should be easily carried by one person. The invention may powered by light weight batteries or it may be an AC powered workstation.

The support arm 8 is attached to support arm 12 by a hinge means 16, such that the latter arm can be rotated though rotation C about the axis of the hinge means, as shown in FIG. 1A. Support arm 8 is attached to the main unit 6 by hinge means 20, such that the arm can rotate though large angles as shown in rotation B about the axis of the hinge means. Thus the above mechanical elements can work in combination, and the user is can adjust the orientation of the display panel assembly 2 in both inclination angle and elevation. The friction of each hinge is such that the user can adjust the orientation by hand, and its position is either self-locking or can adjusted to lock in position. The lengths of the support arms 8 and 12 should be selected to provide the desired display screen elevation and forward viewing positions. Many different combinations of lengths may be embodied.

Several methods can be implemented to give the user to capability to adjust the screen in azimuth angle. One technique is to rotationally attach the display panel assembly 2 to a support structure 4 via a cylindrical hinge pin 5, so that the display can rotate through azimuth angles. The hinge pin 5 can be made hollow so that electrical conductors can be routed through it to the support structure 4. Another method would be to place the main unit on stationary base structure via a lazy-susan structure. Rubber feet may be placed under the main unit, as shown in the figure. The weight of the display panel assembly 2 should be as low as possible, and the mass of the main unit and its electronics should be large enough so that if the display assembly is adjusted in the extreme forward position, the unit will remain physically and gravitationally stable. A computer keyboard unit 7 is shown connected to the main unit 6 via an electrical cable 9. The computer keyboard unit 7 may be attached or detached. If it is a detached keyboard, the electrical signals may be transmitted to the computer via wires or electromagnetic radiation means.

FIG. 1B shows the workstation of in FIG. 1A, except the display panel is folded down to its lowest inclined position and a stylus input means 22 is included. The stylus input means is defined to be a stylus or pen position encoding device that encodes, in two or three dimensions, the position of a hand-held stylus, as the user moves it over an active area corresponding to the display screen. The screen of the display panel is facing upward and at a convenient inclined angle for user hand writing, drawing and sketching with the stylus or pen. An electrical wire/cable 23 may be used to connect the pen/stylus to the control electronics in the main unit. A natural inclined angle of the screen for stylus/pen data input is roughly 30 degrees from the horizontal. However, the display panel assembly may be locked into position at a multiplicity of orientations.

Figure 2:
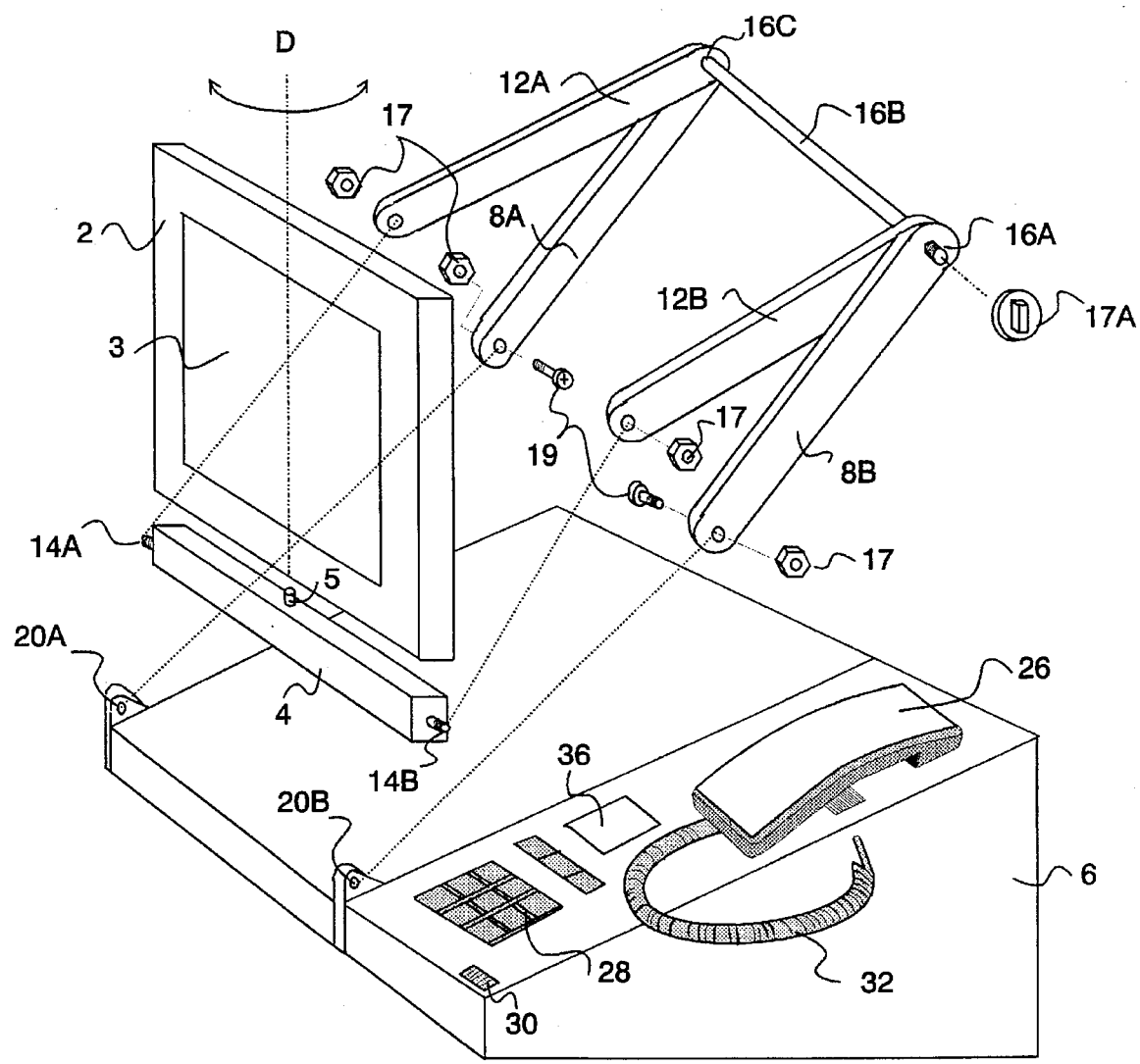
FIG. 2 is exploded perspective view of the desktop workstation with a telephone means placed on one side.

Another embodiment is shown in FIG. 2, which presents a perspective view of another embodiment of the invention, where several elements are shown in exploded view, for clarity. A display panel assembly 2 including its display screen 3 is rotationally connected to the support structure 4 via the cylindrical hinge pin 5. The display panel assembly is then free to rotate through wide azimuth angles D as shown. The support structure 4 is connected to support arm pairs 12A and 12B via hinge means 14A and 14B. The cylindrical shafts of hinges 14A and 14B, which may be threaded, fit in the round holes of the support arm pairs 12A and 12B. Support arm pair 8A and 8B is attached to the previous arm pair at hinge elements 16A, 16B and 16C, where element 16B is a long shaft, the ends of which may be threaded. The other ends of support arm pair 8A and 8B are attached to the main unit 6 via hinges 20A and 20B. The friction of each hinge means may be adjusted by a threaded shaft or screw 19 and a standard nut 17 or a finger tightened nut/knob 17A. The friction should be sufficient to support the display panel assembly under the gravitational and normal hand writing/sketching forces.

As shown in FIG. 2, a telephone unit may be added or integrated into the desktop workstation. A telephone handset 26 and cord 32 may located either side of the workstation. A telephone keypad 28 should be placed in a convenient location of the user. For a hands-free telephone operation, a microphone 30 and speaker 36 may be included. The telephone unit may be attached or detached from the main unit. The telephone may function during workstation operation and/or independently of the workstation operation. A computer keyboard, mouse or trackball devices may be included, in addition to the stylus/pen input means. All controls should be designed to be simple and easy to use.

Figure 3:
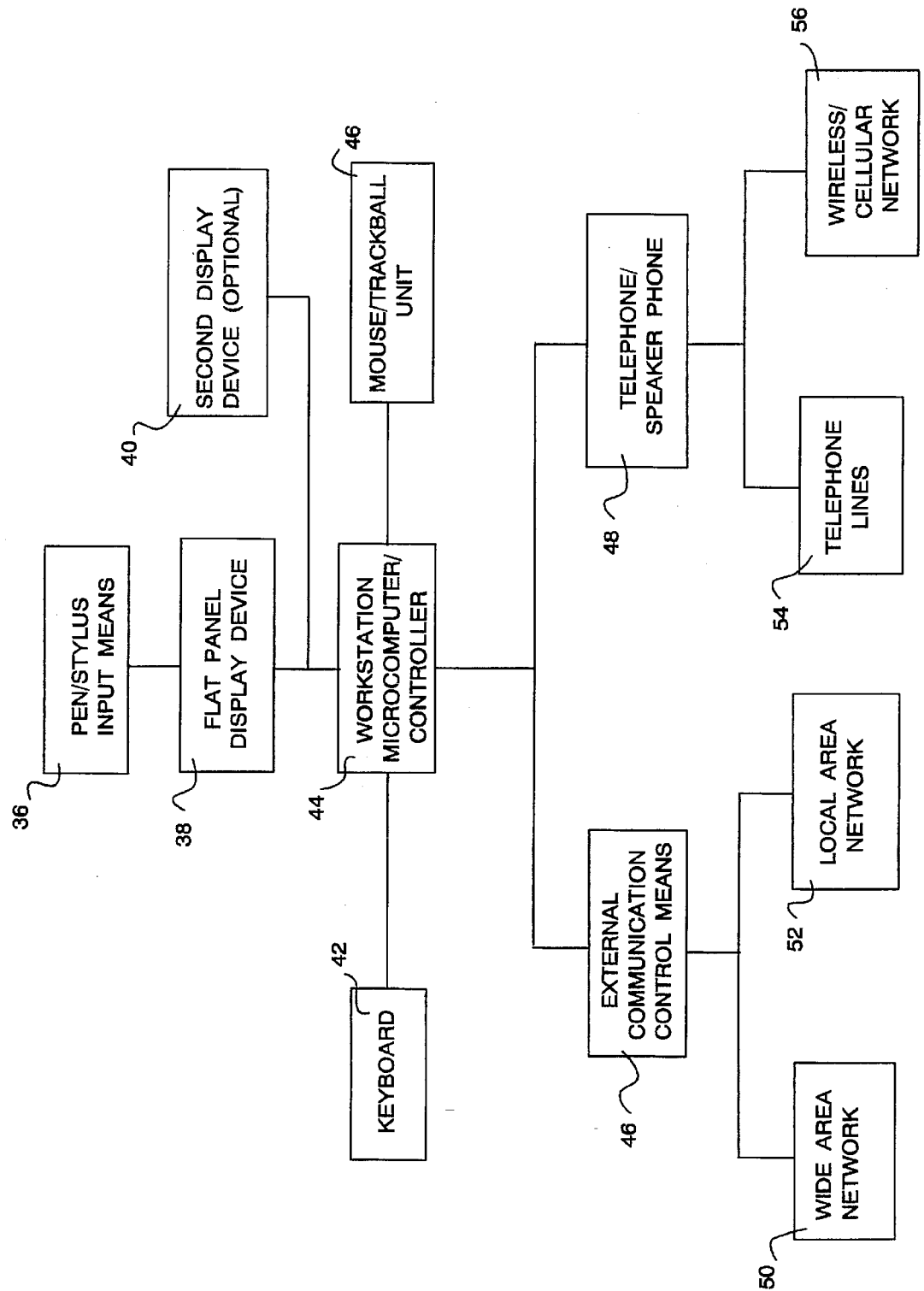
FIG. 3 is a general block diagram of the electrical elements of the invention.

FIG. 3 shows a block diagram of the basic electrical elements of the computer workstation. The pen/stylus input means' electronics 36 can be interfaced directly to flat panel display device electronics 38. Examples of available products that have combined these functions are the Super-K™ display tablet from SuperScript Inc., Video Tablet from Kurta® Corporation, and the PL-100 Integrated Tablet for Wacom Technology Corp. Typically, these products are connected to a controller card in the computer's I/O bus, via a cable. Specifications for such display-tablet include: active area 7.56 by 5.67 inches, accuracy ±0.02 inch, resolution 1016 PPI, data transfer rate 270 coordinate pairs/sec., pen slew rate up to 135 IPS without significant distortion, and stylus/pen weight 15 grams.

As shown in the figure the flat panel display is electrically connected to the workstation microcomputer/controller 44. The microcomputer may be any one of several commercially available products, such as the Intel™ 86286, 86386 or 86486 processors, Motorola Corporation's 68030 or 68040 processors, as well as several others. If the workstation is to be battery powered, then low voltage (3 V) low-power microprocessors should be used. The microcomputer/controller 44 may be embodied by several means.

One available microcomputer system that may be used, is the Moby Brick product manufactured by Ergo Computing of Peabody Mass. The Moby Brick product consists of a 386/486 CPU, with 4 to 32 MB RAM, hard disk s from 170 MB to 1 GB, built in video controller, a 3.5 inch 1.44 MB floppy drive, two serial ports, one parallel port and one ISA 16 bit half length card slot. All the above is built into a 7.9×11.3×3.3 inch module that weighs 8.7 lbs. The CPU required by the invention may be a 20 MHz 386SX, 33/40 MHz 386DX, or the 33 MHz 486DX. Either internal or external modems may be embodied in to the system. An optional expansion chassis may be added to the system with four slots for ISA cards.

Figure 4:
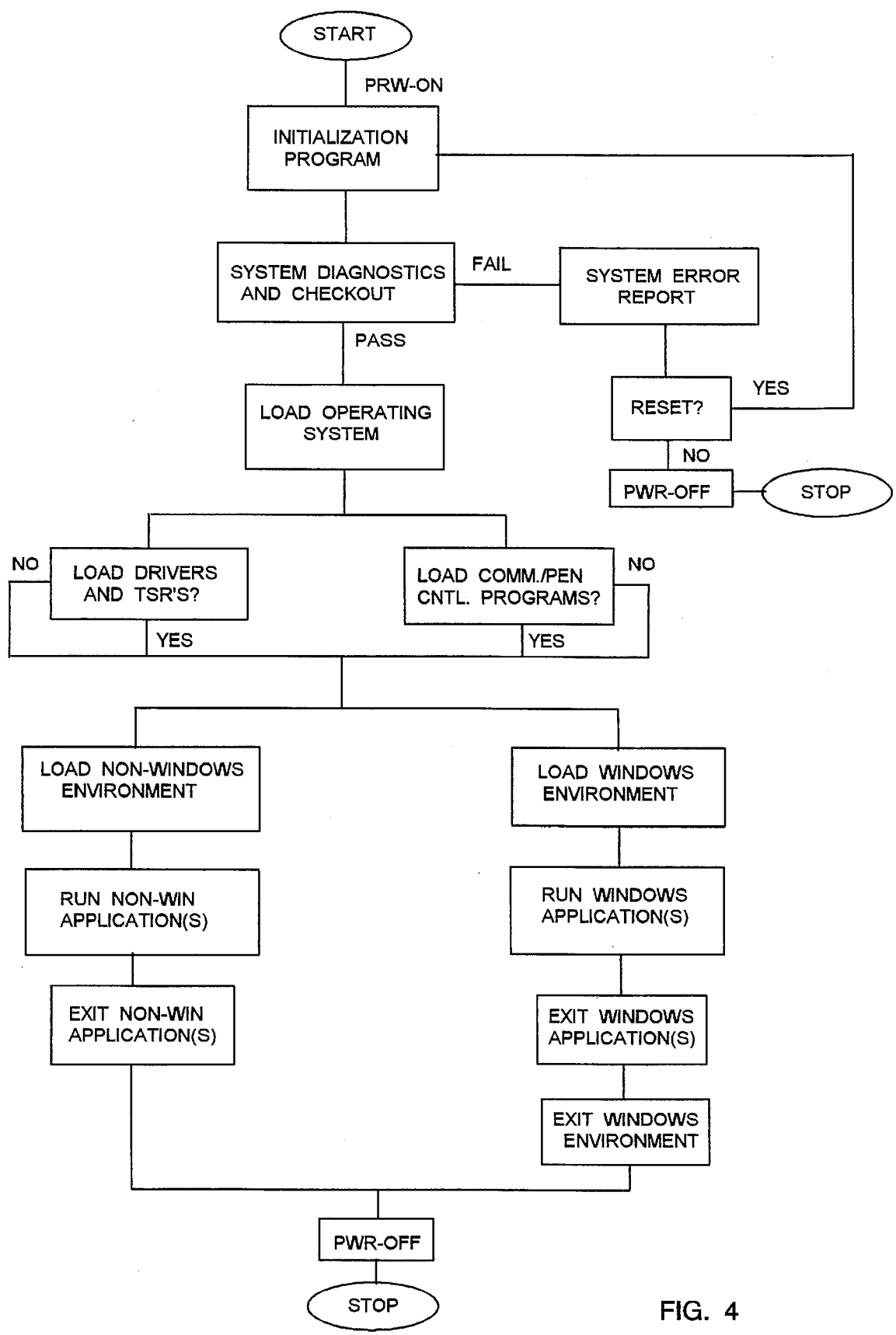
FIG. 4 is a general flow diagram of the software that may execute on the workstation's digital computing means.

FIG. 4 shows a general flow diagram of typical stored program software that may execute in the microcomputer or processor 44. Many commercial available operating systems, window environment and application software are available to run in the microcomputer. Typical operating systems that could be used include Microsoft Corporation's MS-DOS™, IBM's OS/2™, Go Corporation's Pen Point or various companies' UNIX products. Possible windowing environments include Microsoft's Windows™ 3.x and Windows for Pen™, Hewlett-Packard's New Wave™, or X-Windows from various companies. Software may be pen centric like Pen Point™ software or it may be just pen/mouse aware. As shown in FIG. 4, after a standard power up and the system diagnostics and checkout is completed the operating system is loaded. Depending on the desired configuration a number of device driver, TSR's, communication programs and pen/stylus control programs may be loaded. The workstation should be capable of either running windows or non-windows environments.

The microcomputer/controller 44 of FIG. 3 includes associated support electronics, I/O devices and power supply. All the above should be compact in size, so that the size of the overall desktop workstation is as small as practical. The advantage of small size is that it provides a smallest footprint of the desk. This is important in office environments, where desk space is at a premium. The main unit's footprint dimensions, on the desktop, could be in the range of 15 by 13 inches, depending of the size of the screen and whether of telephone handset is included.

The keyboard function 42 may be electrically connected to the microcomputer/controller 44. A standard mouse/trackball unit 46 may be connected to the microcomputer via an I/O card or serial port in the standard manner. Both the pen and mouse/trackball interfaces may be desirable in certain applications. An external communication means 46 is connected to the microprocessor. The communications means could be embodied by a communications I/O card, internal/external modem or other communication means. However embodied, the workstation shall have the capability to communicate data (text, graphics, video, and voice) interactively on either Wide Area Networks (WAN) 50 or Local Area Networks (LAN) 52. The WAN in its simplest form may consist for two workstations connected to each other via internal/external modems over standard or hi-speed telephone lines.

Either an external or internal (built-in) telephone/speaker phone 48 may be connected to the microprocessor/controller. It may integrated into the workstation or embodied as a stand alone device, depending on the user's requirements. The telephone/speaker phone may also be connected to ordinary telephones lines 54 or wireless/cellular networks 56. The primary purpose of the external communication means of the workstation is to provide two way interactive text, graphics (including pen/stylus), video and voice/audio communication to: (1) other users operating similar workstations (at the same time or unattended), and/or (2) one or more computers on a network of computers or terminals. Other standard computing and communication components may be added to the invention that are obvious to those skilled in the art.

In another embodiment, the microprocessor and support electronics 44 can be located at the display panel assembly 2, instead of the main unit 6. For example, they may be located on one or more printed circuit boards surrounding and behind the display screen. Such an implementation with battery power is well known to those skilled in the art.

Prior art flat display devices have been combined with a microcomputer, battery pack, and associated electronics and placed inside the relatively thin display panel enclosures. This has been accomplished in several pocket computers, Personal Digital Assistants (PDA), and hand held tablet computers. For example, battery embodiments have been placed inside the IBM ThinkPad™ 710T, Apple Computer Corporation's Newton™, Grid System's Convertible™ 2260, and Dauphin Technology's DTR-1 computers, to name a few. In order to accomplished the above, developers typically implement the required electrical circuits via semiconductor large scale integration (LSI) techniques. This usually results in a microcomputer, main memory, I/O, display drive and other support circuitry integrated into the circuit boards. The microprocessors that could be embodied must be low-voltage and low-current draw versions, such as Intel™ 386/486SL models. A rechargeable battery pack and power management circuitry should be included in the assembly. The battery pack may be removable via a slot on the side of the display panel assembly 2. The main battery pack typically consists of NiCd or newer Nickel Hydride type batteries. A backup battery may also be embodied. The mass memory components, of these hand held display panel assemblies, may consist of a small magnetic 2.5 or 3.5 inch disk hard drives or semiconductor Flash Memory modules. Mass memory of at least 80 MBytes are typically required. If removable, the battery pack and flash memory modules should conform to the PCMCIA Standards. These standards are important for interchangability among different manufactures. Because of the high level of LSI accomplished today, relatively thin, 1–2 inch thick, display panel assemblies can be realized containing a flat panel display, drive circuitry, microcomputer card, support circuitry and battery pack, within a light weight enclosure. The display panel and computer assembly can then be removed from the support structure 4 and hinge pin 5, as shown in FIG. 1A by a typical removal direction E. This can be accomplished by a simple plug and socket arrangement at the bottom of the display panel assembly. An advantage of this implementation is that two modes of user operation are then possible. One is the desktop operation as described above. The other is a portable mobile display-tablet operation. The user has the option to remove the display-computer unit from the socket, and use it as notebook computer or display-tablet.

Figure 5:
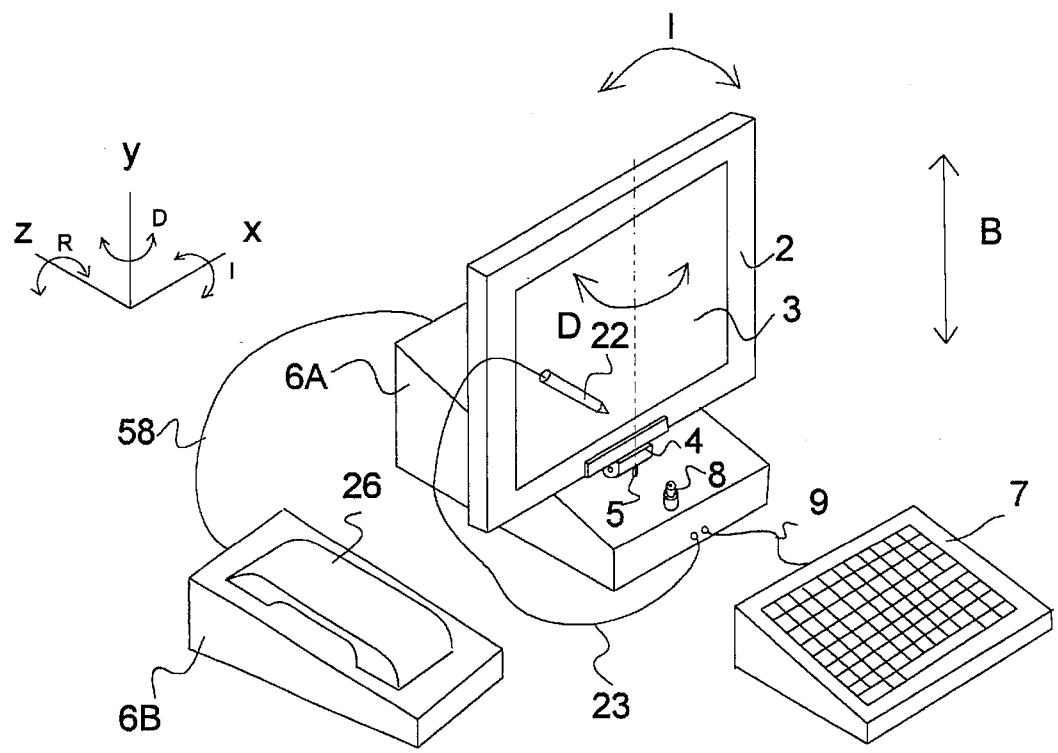

FIG. 5 shows alternate embodiment of the desktop workstation system consisting primarily of a base unit 6A, display panel assembly 2, pen/stylus input means 22, keyboard unit 7, a telephone base unit 6B and a telephone handset 26. The computer or workstation is designed for desktop computing and data communications for typical office, home or factory use. All the major functions for computing, communications, and conferencing are made available to user in this desktop arrangement. The base unit 6A, which is similar to the main unit of FIGS. 1 and 2, is embodied as a somewhat smaller wedge shape enclosure, which does not take up much desk space and provides an inclined position for pen input. The telephone base unit 6B and keyboard unit 7 are shown here as separate units, so that they can be pushed aside to make room on the desktop. Electrical cables 58 and 9 connect the handset and keyboard to the base unit 6A where most of the computer and electronic components are located. The stylus/pen 22 is connected to the computer in the base unit via an electrical cable 23.

The display panel assembly 2 is physically connected to the base unit 6A via a universal hinge arrangement 4 and an actuator assist means 8. This connection is shown in an exploded view in the figure. The universal hinge means may be embodied in many ways, such as a ball and socket joint arrangement. Thus, the display panel assembly 2 with its display screen 3, is position adjustable in a multiplicity of orientations. A Cartesian coordinate system diagram, defining the axes for translations and rotations, is shown in the figure. The panel can be rotated in Inclination angle I, Azimuth angle D, and Roll angle R. Further position adjustment means are added, to provide elevation adjustment along axis y, as shown in double arrow B.

The display panel assembly 2 may be electrically connected to the electronics in the base unit by running a cable through the hinge pin 5 and through the actuator assist means 8 attached to the hinge pin. Sufficient slack in the cable must be provided for the full height of the adjustment range. A slack take-up means should be provided, so that when the panel is in its lower elevation positions, the cable does not bind. The vertical force of actuator assist means should be roughly equal to the weight of the display panel assembly 2. The actuator assist means 8 could be embodied by several alternative devices, including an air spring, a mechanical spring, pneumatic, hydraulic, or electromechanical actuator means. One or more actuators could be included. A means for locking and unlocking the actuator position should be provided within the assist means 4. Such actuators and locking mechanisms are well known to those in the art.

Even though flat panel display assemblies typically weigh only a few ounces, there are several reasons why an actuator assist means may be desirable. If an actuator is not implemented, and the user desires to raise the panel vertically by hand, the user would have to grab one edge of the panel and pull up. If the base unit is not secured to the table or it is not sufficiently heavy, the entire unit may lift off the table. The user would have to place one hand on the base unit and the other on the display panel and pull. Both of the above user actions are undesirable. Using two hands for a simple position adjustment, takes more time to accomplish, and the user may lose his/her's concentration during a computing task. Making the base unit heavy enough so that its weight is larger than the force applied by one's hand is also undesirable. Therefore, a telescoping actuator means 8 should be embodied with a force roughly equivalent to the weight of the display assembly 2, so that the user can easily adjust the position of the display panel by hand. The actuator means may include a locking and unlocking means for temporarily holding the display assembly in the desired position.

Figure 6A:
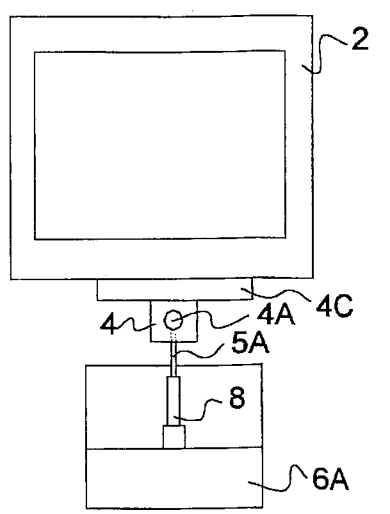
Figure 6B:
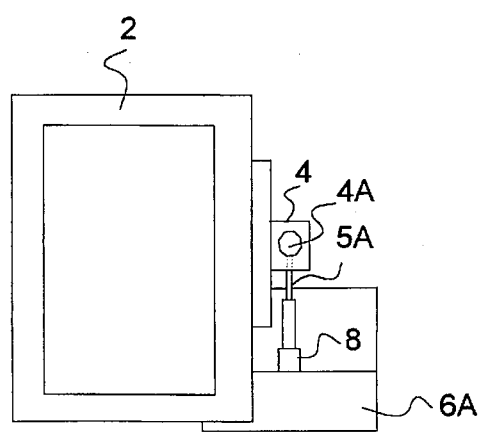

An alternate embodiment is shown is FIGS. 6A and 6B, showing front views of a desktop unit with a universal ball and socket type support and hinge means 4 attached to the display panel assembly 2, as well as other components. The support and hinge means consist of an L-shaped support member 4C, such that the display panel, when supported near the front of the base unit 6A, can be rotated about the z-axis (shown in FIG. 1) and miss the front edge of the base. The L-shaped member 4C, as shown is FIGS. 6A and 6B, is foreshortened (i.e., one side of the L is pointing out of the paper). FIG. 6B shows a front view of the display panel, where the panel is rotated 90 degrees to the typical portrait display orientation. The locking and unlocking part 4A can be a hand knob for applying a force to a hinge means. In this embodiment, the locking knob is facing forward, toward the front of the desktop unit. Other locking/unlocking knob positions are possible. A support post 5A is fixed to the actuator assist means 8 at one end and is attached to the support and hinge means 4 at the other. The assist actuator means 8 may consist of several telescoping arm and post members, in order to provide for greater elevation travel. The actuator means should be capable of collapsing into a unit with relatively small height dimension. This later feature is important because the height dimension of front portion base unit is relatively small. As above, the support post can be hollow to allow the electrical cable to be routed through it. An advantage of the FIGS. 6A and 6B embodiment is that it provides for both landscape and portrait screen orientations in the same desktop unit, which the user can easily change by hand.

The embodiments of FIG. 5 and FIG. 6 results in a relatively integrated desktop computer and telecommunication system, designed to used by a person at his/her desk. The system is designed to replace the user's exiting telephone and desktop computer, with a general purpose integrated telephony and computing system. An unique aspect of this invention is that the wedge shaped base unit 6A, telephone handset enclosure 6B and the keyboard unit 9 are made to be small separate units, but the display panel assembly 2 can be quite large. The telephone handset and enclosure combination can be slide under the display panel assembly, to save desktop space. This embodiment allows the user to move these separate units out of the way when not in use, and pulled into position when required.

The scope of the invention disclosed here should be determined by the appended claims and their legal equivalents, rather than by the examples given above.

I claim:

1. A desktop computer system comprising:
   a. a flat display panel assembly defining a display screen and support structure with a first hinge pair at the bottom edge of the display panel assembly;
   b. a first support arm pair physically connected to the display panel assembly via the first hinge pair, such that the display panel can be rotated in inclination angle by hand;
   c. a second support arm pair connected to the other ends of the first support arm pair via a second hinge pair;
   d. means for digital data computing, which is electrically connected to the display panel assembly and which controls the display panel assembly's operation;
   e. means for housing main electronics having a third hinge pair located near the front corners of the unit, wherein the third hinge pair connects to the other ends of the second support arm pair, such that the display panel assembly, first support arm pair and second support arm pair can be rotated by hand though large angles independently or together for ergonomic human viewing;
   f. said hinge pair means are such that they each have sufficient friction to physically support the display panel and support arms under gravity; and
   g. the said main housing means being sufficiently large to enclose the computing means and associated power and control electronics.

2. A desktop computer system as recited in claim 1, further comprising means for stylus input electrically connected to the display panel assembly, wherein hand written, drawn and pointing information can be entered to the display panel, and wherein the first support arm pair and second support arm pair can be folded together for ease of writing and viewing.

3. A desktop computer system as recited in claim 1, further comprising a means for azimuth rotation of the display panel with respect to the display support structure, such that when the apparatus is on a standard desk or table the display screen can be rotated though azimuth angles by hand to adjust for various operator positions.

4. A desktop display unit for viewing by the user, which is to be placed onto to the top of a desk or table structure, wherein the table surface area taken by the display unit is relatively small, yet the unit is physically stable, comprising:
   a. a flat panel display assembly defining a display screen and control electronics;
   b. a support hinge pair connected to the bottom edge of the flat panel display assembly;
   c. means for support arm position adjustment connected the flat panel display assembly for elevation and inclination position adjustment;
   d. means for pivot connector attached to the bottom portion of the support arm position adjustment means, wherein the support hinge, support arm position adjustment means and pivot connector means work in cooperation for rearward and forward inclination adjustments, and for elevation translation adjustments; and
   e. a roughly wedge shape base unit connected to pivot connector means near the front end of the wedge shape base unit, wherein the front end is defined to be at the short height end on the wedge shape base unit, such that the user has the option to rest the display assembly onto the inclined surface of the wedge shape base for improved ergonomic human viewing.

5. A desktop display unit of claim 4, further comprises of a computer system electrically interfaced to the flat panel display assembly, wherein the computer system is comprised of conventional computer elements, including CPU, internal memory, I/O bus, and mass memory storage.

6. A desktop display unit of claim 5, further comprising a keyboard unit having a multiplicity of finger operable keys, wherein the keyboard is electrically connected to the computer system.

7. A desktop display unit of claim 5, in which the wedge shaped base unit is made sufficiently large to form an enclosure for housing control electronics, wherein the computer system and associated support hardware is located, electrically interfaced to the flat panel display assembly.

8. A desktop display unit of claim 4, in which the support hinge is adapted to azimuth rotation through sufficient angles, such that the display assembly can be rotated though azimuth angles by hand to adjust for various operator positions.

9. A desktop display unit of claim 4, in which the display assembly contains a computer system, battery power source and associated hardware, wherein the display assembly can be disconnected from the rest of the unit, so that a user can operate the computer and display while hand carrying it in a mobile fashion.

10. A desktop display unit of claim 4, further comprising means for stylus or pen input electrically interfaced to the display assembly, wherein handwritten information is displayed on the display screen, and wherein the inclined surface on the wedge shaped base unit providing an inclined writing angle, for improving handwriting accuracy with the pen or stylus input means.

11. A desktop display unit of claim 4, in which the support hinge and pivot connector means includes a locking and unlocking means, wherein the user has the option to adjust the position of the display assembly by hand and relatively quickly lock it into a fixed position and relatively quickly unlock the fixed display assembly position for adjustment.

12. A desktop display unit of claim 4, in which the means for support arm position adjustment contains spring assist apparatus and is connected to a roughly flat base structure replacing the roughly wedge shaped base unit, via the pivot connector means, wherein the pivot connector is physically connected at a point from mid to near the rear of the roughly flat base structure.

13. A desktop display unit for computer use by a user, which is to be placed onto to the top of a desk or table structure, wherein the table surface area taken by the display unit is relatively small, yet the unit is physically stable, comprising:

a. a flat panel display assembly defining a display screen and control electronics;

b. a support hinge pair connected to the bottom edge of the flat panel display assembly;

c. means for telescoping post support connected to the bottom of the support hinge, where the support post comprises of a plurality of collapsing sections in telescoping fashion;

d. a roughly wedge shape base unit attached to telescoping support post means near the front end of the wedge shape base unit, wherein the front end is defined to be at the short height end of the wedge shape base unit, whereby the user has the option to rest the display assembly on to the inclined surface of the wedge shape base; and e. said support hinge and the telescoping post means working together to provide the user the option to orient the display assembly in elevation and inclination by hand adjustment through large ranges for improved ergonomic human viewing.

14. A desktop display unit of claim 13, in which the support hinge is adapted so that the user has the option of adjusting the orientation display assembly through roll angle rotation adjustments, such that the display screen can be rotated between portrait and landscape orientations by hand and locked into position.

15. A desktop display unit of claim 13, further comprises of a computer system electrically interfaced to the flat panel display assembly, wherein the computer system is comprised of a convention computer system elements, including CPU, internal memory, I/O bus, mass memory, and external communication ports.

16. A desktop display unit of claim 15, further comprising a keyboard unit having a multiplicity of finger operable keys, wherein the keyboard is electrically connected to the computer system.

17. A desktop display unit of claim 13, in which the wedge shaped base unit is made sufficiently large to form an enclosure for housing control electronics, wherein the computer system and associated support hardware is located, which is electrically interfaced to the flat panel display assembly.

18. A desktop display unit of claim 13, in which the support hinge is adapted to azimuth rotation through sufficient angles, such that the display assembly can be rotated though azimuth angles by hand to adjust for various operator positions.

19. A desktop display unit of claim 13, in which the display assembly contains a computing system, battery power source and associated hardware, wherein the display assembly can be disconnected from the rest of the unit, so that a user can operate the computer and display while hand carrying it in a mobile fashion.

20. A desktop display unit of claim 13, further comprising means for stylus or pen input electrically interfaced to the display assembly, wherein handwritten information is displayed on the display screen, and wherein the inclined surface on the wedge shaped base unit providing an inclined writing angle, for improving handwriting accuracy with the pen or stylus input means.

21. A desktop display unit of claim 13, in which the support hinge and the telescoping post support means includes a locking and unlocking means, wherein the user has the option to adjust the position of the flat panel display assembly by hand and relatively quickly lock it into a fixed position, whereby it follows that the user also has the option to relatively quickly unlock the display assembly position.

* * * * *

UNITED STATES PATENT AND TRADEMARK OFFICE
CERTIFICATE OF CORRECTION

PATENT NO. : 5,668,570
DATED : 09/16/97
INVENTOR(S) : Richard J. Ditzik

It is certified that error appears in the above-indentified patent and that said Letters Patent is hereby corrected as shown below:

At Column 8, line 45, change "Fig. 1" to -- Fig. 5 --

Signed and Sealed this

Third Day of November, 1998

Attest:

BRUCE LEHMAN

Attesting Officer      Commissioner of Patents and Trademarks